United States Patent
Manzano Doñabeitia

(10) Patent No.: US 11,544,656 B1
(45) Date of Patent: Jan. 3, 2023

(54) SELF QUALIFIED PROCESS FOR CLOUD BASED APPLICATIONS

(71) Applicant: Bigfinite Inc., San Francisco, CA (US)

(72) Inventor: Antonio Manzano Doñabeitia, Barcelona (ES)

(73) Assignee: Bigfinite Inc., San Francisco, CA (US)

( * ) Notice: Subject to any disclaimer, the term of this patent is extended or adjusted under 35 U.S.C. 154(b) by 0 days.

(21) Appl. No.: 16/886,565

(22) Filed: May 28, 2020

Related U.S. Application Data

(60) Provisional application No. 62/956,105, filed on Dec. 31, 2019.

(51) Int. Cl.

| | | |
|---|---|---|
| *G06F 9/44* | (2018.01) | |
| *G06Q 10/06* | (2012.01) | |
| *G06F 11/36* | (2006.01) | |
| *H04L 67/10* | (2022.01) | |
| *G06N 5/04* | (2006.01) | |
| *G06N 20/00* | (2019.01) | |

(52) U.S. Cl.
CPC ... *G06Q 10/06395* (2013.01); *G06F 11/3664* (2013.01); *G06F 11/3676* (2013.01); *G06F 11/3692* (2013.01); *G06N 5/04* (2013.01); *G06N 20/00* (2019.01); *H04L 67/10* (2013.01)

(58) Field of Classification Search
CPC .... G16H 50/30; G06Q 10/0635; G06Q 10/06; G06F 11/3676; G06F 3/04845; G06F 11/3608; G06F 11/3684; G06F 8/76; G06F 11/3664; G06F 11/3692; H04L 45/44; H04L 63/20; H04L 63/0227; H04L 63/30; H04L 67/10; G06N 20/00; G06N 5/04

See application file for complete search history.

(56) References Cited

U.S. PATENT DOCUMENTS

| | | | |
|---|---|---|---|
| 8,407,078 B1 * | 3/2013 | Caputo | G06Q 10/06 705/7.27 |
| 9,349,111 B1 * | 5/2016 | Elgarat | G06Q 10/0635 |
| 2002/0042687 A1 * | 4/2002 | Tracy | H04L 63/30 702/119 |
| 2009/0228316 A1 * | 9/2009 | Foley | G06Q 10/06 705/7.28 |

(Continued)

OTHER PUBLICATIONS

Montrium Inc., fenton et al, "Building a Qualified Cloud Strategy", Montrim inc. 2014, 47 pgs <Montrium_2014.pdf>.*

(Continued)

*Primary Examiner* — Tuan A Vu
(74) *Attorney, Agent, or Firm* — Fish & Richardson P.C.

(57) ABSTRACT

Methods, systems, and apparatus, including computer programs encoded on computer storage media, for performing self qualification of cloud based applications. One of the methods includes analyzing, by a self-qualified process (SQP), a set of risks for a cloud based software platform, wherein each risk comprises a set of features that are being evaluated according to a risk definition; performing, by the SQP, one or more tests related to one or more risks of the set of risks; and based on an outcome of each of the tests, generating a measure of a qualification state for the cloud based software platform, wherein the measure of the qualification state is used to determine self-qualification of the software platform.

20 Claims, 4 Drawing Sheets

(56) References Cited

U.S. PATENT DOCUMENTS

| | | | |
|---|---|---|---|
| 2010/0235807 A1* | 9/2010 | Doddappa | G06F 11/3664 717/101 |
| 2011/0004867 A1* | 1/2011 | Holden | G06F 11/3676 717/127 |
| 2015/0163131 A1* | 6/2015 | Bauer | H04L 45/44 709/223 |
| 2015/0178182 A1* | 6/2015 | Mallya | G06F 11/3684 717/124 |
| 2015/0215332 A1* | 7/2015 | Curcic | H04L 63/20 726/25 |
| 2015/0346705 A1* | 12/2015 | Chew | G06Q 10/06395 700/86 |
| 2016/0099963 A1* | 4/2016 | Mahaffey | H04L 63/0227 726/25 |
| 2016/0267150 A1 | 9/2016 | Gubau I Forné et al. | |
| 2017/0169370 A1* | 6/2017 | Cornilescu | G06Q 10/0635 |
| 2019/0066028 A1* | 2/2019 | Shor | G06F 3/04845 |
| 2019/0294531 A1* | 9/2019 | Avisror | G06F 11/3676 |
| 2019/0310929 A1* | 10/2019 | Wright | G06F 11/3608 |
| 2020/0168335 A1* | 5/2020 | Lassoued | G16H 50/30 |
| 2020/0293310 A1* | 9/2020 | Mittell | G06F 8/76 |

OTHER PUBLICATIONS

Chow, "Testing Software Design Modeled by Finite-State Machines," IEEE Transactions on Software Engineering, SE-4(3): 178-187 (1978).

Goldberg et al., "Using Collaborative Filtering to Weave an Information Tapestry," Communications of the ACM, 35(12):61-70 (1992).

Herlocker et al., "Explaining Collaborative Filtering Recommendations," In Proceedings of the 2000 ACM Conference on Computer Supported Cooperative Work, CSCW '00, pp. 241-250 (2000).

Tintarev and Masthoff, A Survey of Explanations in Recommender Systems, In Proceedings of 2007 International Conference on Data Engineering (May), pp. 801-810 (2007).

* cited by examiner

SELF QUALIFIED PROCESS FOR CLOUD BASED APPLICATIONS

CROSS-REFERENCE TO RELATED APPLICATIONS

This application claims the benefit under 35 U.S.C. § 119(e) of the filing date of U.S. Patent Application No. 62/956,105, for Self Qualified Process for Applications Based on Cloud, which was filed on Dec. 31, 2019, and which is incorporated here by reference.

BACKGROUND

Nowadays there is a large amount of information continuously created and stored in various "clouds" of distributed storage and/or processing coming from a growing legion of systems. This information is provided by different data sources and it is stored in a heterogeneous way. Each atomic data is related in some way with other data, e.g., by the timestamp when they were created, by their geolocation, based on their origin, etc. The ability to access this large amount of information from a centralized location could lead to new knowledge. Nevertheless, the lack of standardization on its raw format provokes a loss of strength when it is required to ensure the parameters that must work for regulated environments.

This scenario is a reality for many different environments that are sharing information in the cloud (administration, public organizations, private companies, enterprises, individual, commercial transactions, education, social media, etc.). This specification discloses a standard format to manage the needed requirements for a cloud platform that must be qualified under a regulated context from an architectural point of view.

SUMMARY

The features described in this specification can be implemented as part of a global solution for managing data in regulated environments by cloud based software applications. The specific implementations described in this specification are framed in a platform that works with information managed by two main actors: a proprietary cloud based software application and third party platforms where specific services are delegated. In addition, implementations can be conceptualized in a framework intended to provide a global solution for specific industries, e.g., the pharmaceutical industry, based on cloud computing.

An example of a real-world scenario where these features could be applied is illustrated by cloud based software applications, where the client part is thin and where the engine to manage processes and data is located on one or more servers of the cloud. Furthermore, the server side is managed by an application and a standard platform that provides specific services to the clients. The proposed procedure to manage regulated information is intended to gather for instance, the results of any actor involved during the manufacturing and distribution of medicines, executing actions under GMP rules using the cloud platform (GMP is the acronym of Good Manufacturing Practices and establishes how to proceed in order to produce safe food, drug products, and active pharmaceutical ingredient products. In the USA the GMPs are enforced by the U.S. Food and Drug Administration (FDA), under Title 21 CFR. In the same way, in different areas of the world specific GMP guidelines have been developed, often existing from a common root published by the World Health Organization). Under this context, the activities performed by all actors and the information generated by them must be guaranteed by the owner of each process. One example solution for managing data in regulated environments is described in U.S. Patent Application Publication US 2016/0267150, for "Managing Data in Regulated Environments", filed on the 8 Feb. 2016, which is incorporated here by reference.

This document describes a standard way to develop cloud-based software applications that encapsulate information, processes, and data administration that are subjected to regulated environments (consider for example the manufacturing processes where a medicine is involved). This standard provides the total traceability regarding processes under regulated environments.

BRIEF DESCRIPTION OF THE DRAWINGS

Like reference numbers and designations in the various drawings indicate like elements.

DETAILED DESCRIPTION

I. Contextual Framework

Qualification Versus Validation

Under a regulatory context, a qualification term appears several times in the United States Pharmacopeia 29-National Formulary 24 (USP 29-NF 24), for example in the chapters Biological Indicators for Sterilization (<1035>), Ancillary Materials Cell, Gene, and Tissue-Engineered Products (<1043>), Cell and Gene Therapy Products (<1046>). The qualification concept is associated with systems, facilities or equipment (can be considered as things) and must be understood as a process to ensure that these things are achieving the expected acceptance criteria defined in the quality attributes and parameters that previously have been identified. Therefore, the qualification is a status of quality assurance for systems, facilities or equipment supported by documented evidence that proves the right use of them.

The qualification must be differentiated from a validation concept. The validation term also appears on numerous occasions in the same USP 29-NF 24 document (e.g., in the chapters Analytical Data—Interpretation and Treatment (<1010>), Validation of Alternative Microbiological Methods (<1023>), Validation of Compendial Procedures (<1225>)) and can be understood as a documented evidence that ensures that a specific system, process, or facility is consistently generating an output with a predefined quality attributes and specifications.

Thus, in summary, the validation acts over processes and procedures while qualification affects things. Usually, the validation of a system or equipment implies a previous qualification of it.

The content of this document describes a standard architecture and configuration for a cloud based software platform that must be qualified for regulated environments.

Context

The context where the proposed standard architecture and configuration should be implemented can be understood as an environment managed in a distributed environment such as the cloud, with different components that offer the regulated features implemented in different technologies. This context must be considered under regulatory conditions ensuring aspects like full traceability, security conditions (e.g., as proposed in the FDA 21 CFR Part 11 rules, see, US FDA, "Pharmaceutical cGMPs for the 21st Century: A Risk-based approach. Final report." September 2004, which is incorporated here by reference), access requirements, privacy, performance, visibility, and data guarantees.

The rules described in this document are examples that are designed for software applications that run under a cloud architecture and where there are services that provide artificial intelligence features as machine learning. These guidelines have been designed to be applicable in cloud software platforms independent of the implemented functionality.

Figure 1:
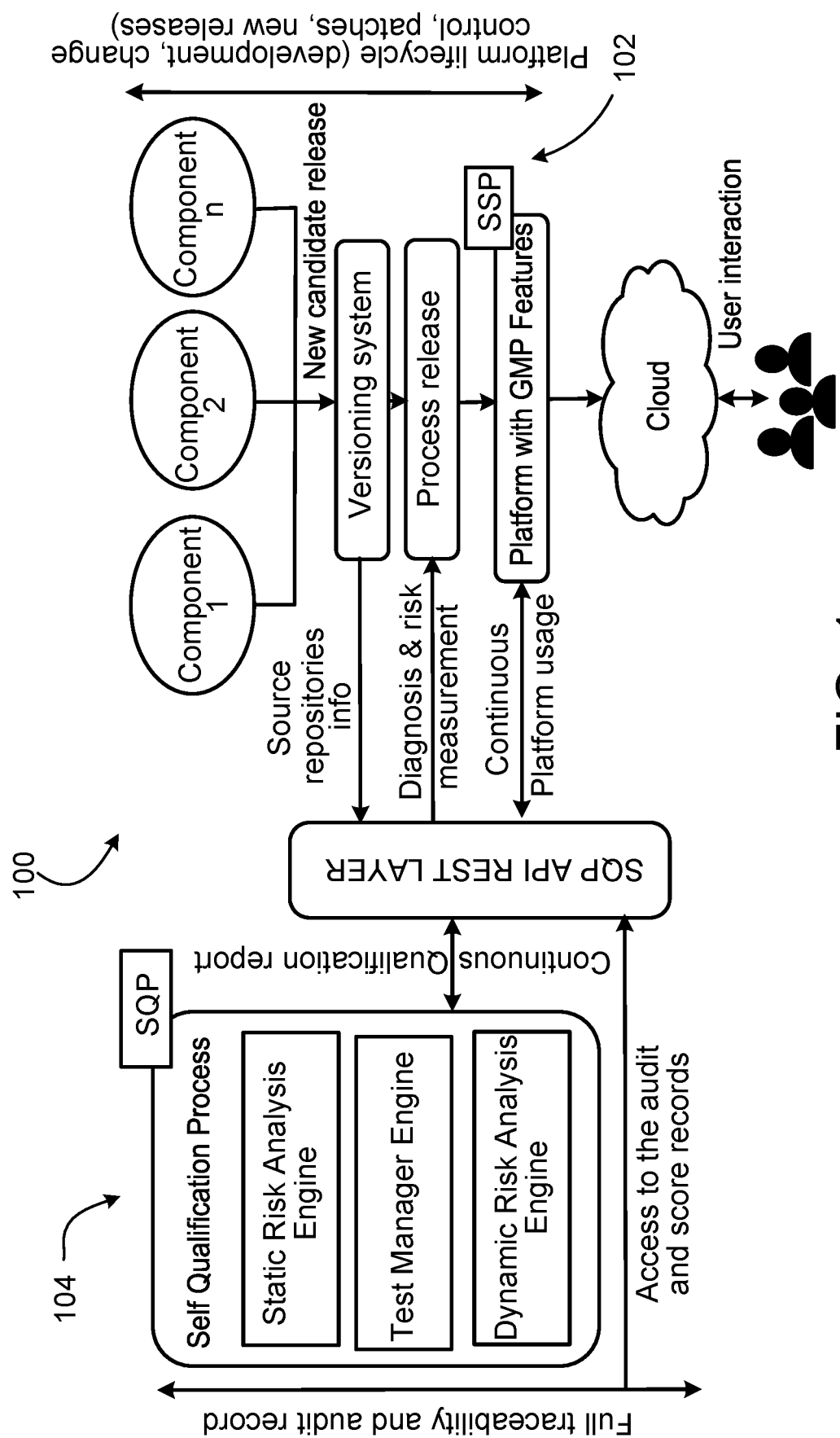
FIG. 1 is a diagram of an architecture based on a standard software platform that offers features for regulated environments.

FIG. 1 is a diagram 100 of an architecture based on a standard software platform that offers features for regulated environments. The architecture illustrates the required elements to apply the above guidelines. In particular, the architecture 100 includes a standard software platform (SSP) 102 and a self-qualified process (SQP) 104. The SSP 102 references any software platform that must offer functionalities for regulated environments. The SQP 104 references the qualification mechanism that must qualify the SSP as a system.

The SQP 104 is designed to work in a software as a service architecture (SaaS). The direct implication is that the SQP 104 can work with multiple SSPs 102, all of them always separated and individually managed but with only one entry-point. Authentication processes are used to redirect data to the right environment that cannot be transgressed among users belonging to different environments.

Assumptions and Requirements

The presented rules presented in this specification to establish an SQP system that can qualify a generic software that is required to be qualified (SSP) based on the architecture shown in FIG. 1 works under the following suppositions:

Assumption 1. The SSP and the SQP are accessible through a set of Application Program Interfaces (APIs) that provides for call methods and actions in a separated way from the Graphical User Interface (GUI) or from a background software application. That implies that the activity that manages tasks on the SSP and the SQP is not located in the view layer. The set of APIs manage information in the server and it is accessible by direct call without GUI interaction.

Assumption 2. The API calls are performed through REST calls (REST is an acronym for Representational State Transfer. It represents a specific software architecture. More detail is described in the reference: en.wikipedia.org/wiki/Representational_state transfer).

Assumption 3. The cloud based software application can work with a Graphical User Interface used as an intermediate layer between the final user and the data. The SSP and the SQP are located in the cloud.

Assumption 4. The SQP system runs in a platform where AI services are delegated. These services (e.g., Machine Learning) are considered in this document as statistical tools in order to get results from a set of raw data. Various suitable machine learning techniques can be used without departing from the scope of this specification.

In some implementations, the following requirements are mandatory to ensure that raw data is unalterable and that not all of the processes followed by the SQP are affected by this information:

Requirement 1

Raw data generated by the SQP can never be modified by the same SQP system (API must be also considered as part of the SQP) nor externally. In some implementations, this requirement affects only to the critical data (for instance, as understood under a GMP context) and obeys to the "Data Integrity Guidelines" (U.S. Department of Health and Human Services Food and Drug Administration, Data Integrity and Compliance with CGMP Guidance for Industry, April 2016 (2016), incorporated here by reference). The SQP can also insert new information in the SSP (e.g., by calling the public SSP API or executing the configured tests). The information created inside the SSP environment from the SQP activity is always related to the test execution activity, and never through a direct insertion from the SQP to the SSP. Records produced in the SQP are always signed by a special characteristic that allows for differentiation of these records from those produced by the SSP. This requirement implies two different conditions:

The system that is being qualified (SSP) allows access to the information generated by itself using only the features that have been designed for this scope (e.g., by calling the SSP's public API).

The SSP is responsible for the use of their data as well as its access. SQP will interact with the SSP's data lake through test execution via API.

The raw data produced by the SSP during its qualification process and generated by itself is stored inside its own data lake. Considering the qualification process under regulated constraints, the related data should not be updated. Nevertheless, is the end user and the SSP functionalities that have the final decision on this action when the SQP is configured as described below.

Requirement 2

Authentication and authorization are implemented in the environment SQP (required) and desirable in the SSP (depending on the user needs), as described, for example, in the reference: 21 CFR 11 Guideline (Guidance for Industry Part 11, Electronic Records; Electronic Signatures—Scope and Application. U.S. Department of Health and Human Services Food and Drug Administration. August 2003, incorporated here by reference. These functionalities are required for computer systems (even when they are managed in the cloud) that manage data in regulated frameworks. The authentication and authorization are associated with a context restricted for the SSP that is being qualified.

II. Description of System Elements

In a typical client-server software application, the qualification of the system depends on the end user's equipment and procedures. The software installation and configuration are performed in a local system that can be controlled and managed entirely by the end user. Both environments (SSP and SQP) work in the cloud, and additionally they can delegate specific functionalities in other cloud services under a third party relationship (like storage, computing, or machine learning services). From this perspective, the qualification of an SSP cannot follow the same steps that the classic client-server software does.

In order to describe the process that allows for the self-qualification of an SSP (as executed by the SQP), the needed elements involved in the qualification process are described below:

Tests

A set of tests that check specific functionalities in the SSP. These tests are accessible through an appropriately configured API. A test as used in this specification is a script or piece of source code, isolated from the production code, that allows the system to verify a feature based on the conditions of a start point and the checks with the obtained results. The set of needed tests to execute the proposed SQP can belong to any of the following types:

Non-invasive executable tests provided by the SSP manufacturer. These tests should be called using API calls (for instance a REST call) and they only perform actions without interaction with the data and storage. Calculations using predefined initial conditions based on static expressions are examples of this type of tests.

Invasive tests provided by the SSP manufacturer. These have the same structure as the non-invasive tests, but they require information to be introduced in the system in order to evaluate the data management (for instance insertions, updates, deletes, performance, etc.). Ideally, the invasive tests should remove all of the infrastructure that has been used for the verification once the test has finished, but that is not required. Data generated during the test execution could belong to the test purposes and could be required to persist beyond the test.

Customized tests. The SSP must allow for the inclusion of additional tests that the user of the platform needs to include in the SQP, for example, in order to cover specific functionalities related for example with the performance, with the configuration or with any customized feature added to the system by the end user. The customized tests follow the same conditions as the tests provided by the SSP manufacturer in order to be called passing the input parameters and getting the output results in the same way.

Risk Analysis

Risk analysis with a set of identified risks associated with the use of the SSP. The risk analysis can be evaluated following rational criteria (an example of a rational technique is the Failure Mode and Effects Analysis (FMEA) tool, which is a structured and systematic technique for failure analysis). In some implementations, the risk analysis evaluates software or software components for potential malfunction, for example, the malfunction of a feature that has been updated in a software update from a previously working version. Each risk is linked with a set of tests (invasive, non-invasive and/or customized) and with a set of features or functionalities that are published by the SSP provider. Each risk has a score (for example low, medium, or high). The set of risks is defined by the SSP and can be customized by the end user. Thus, a traceability matrix is provided with the following dimensions:

Risk definition
  Risk score
  Set of tests that cover the risk
  Set of features (provided by the SSP or by the user) that are affected by the risk. APIs are also considered as functionalities to be covered by the risks.

Learning Mechanism

A learning mechanism that allows additional test executions or the creation of new tests to be proposed to properly cover features that are not safety qualified. Additional functionalities that will be described below are performed by this mechanism. The learning engine can be delegated in a cloud platform and can be based on different algorithms (neural networks, Bayesian networks, etc.). The intrinsic structure of the learning mechanism and the platform where it is delegated does not matter for the purpose of the SQP description. The information managed by the learning mechanism to extract knowledge is based on the following inputs:

Frequency of the executed tests (considering each type).
  Results produced after the test execution (ok or ko [not ok]).
  Spent time for each test execution.
  Covered risks and features (also related with API).
  Risk evaluation and number of covered API for each test execution
  Frequency of the API calls All tests (invasive, non-invasive, and/or customized) follow a pattern in their call and in the output result to standardize their management. Therefore, their use should consider the following options:

API Call: Tests must be able to be called through an external API managed in the SSP. The API must include parameters (names and values) that allow it to configure the test.
  Start point: The test must allow to parametrize the set of start conditions that initialize itself. The start point can be informed in the API call.
  End point: The test must allow to parametrize the set of end conditions that finalize itself. The end point can be passed to the API in a similar way than the start point does.
  Result: The test must retrieve a Boolean result as conclusion of the test execution.
  Errors: This option is not required but advisable in order to keep the end user informed about possible problems during the test execution. This element publishes the list of happened errors during the test execution and allows access to them.

III. Description of the Elements and Terms Involved in the Qualification Process The qualification process needs a set of elements to execute a qualification iteration. Based on the assumptions, requirements and needed elements described above, the self-qualification process works with the following variables and concepts:

Risks

Risk is a measure of hazards or potential malfunctioning in the software. Often, the SSP's manufacturer establishes the list of risks associated with the different aspects that govern the platform. The items to be considered in the risk analysis should be related with sensitive topics (for example, in the Pharma Industry they should cover GMP and Security aspects), to avoid trivializing the risks to be managed. A subset of the risks provided by the SSP's manufacturer must cover the third parties and delegated cloud services as additional risks. Besides, the SSP's users can directly create the risks that they consider suitable, thereby adding a customized meaning to the risks collection. Each risk is evaluated with a numerical score that leads to establishment of an evaluable scale for each risk. Each risk also has a numerical priority depending on specific criteria (e.g., the FMEA methodology evaluates the priority managing a number known as a risk priority number ("RPN") that is the result of the multiplication of the Severity multiplied by the Probability multiplied by the Detection for a given event that can be evaluated in terms of the risk analysis. Referenced in en.wikipedia.org/wiki/Failure_mode_and_effects_analysis, incorporated here by reference). This priority is defined as a number with a top value as high limit and represented by $P_{Max}$. Each risk is represented by $R_i$ and its individual score for the priority evaluation is represented by $p_i$. The individual priority is assigned by the user depending on the applied criteria (for instance, following the FMEA methodology referenced above).

Tests

Tests can be programs or manual checks used to assess a specific software functionality. Each risk should have at least one test that covers the risk in some manner, although it is not mandatory. For the defined tests, it is not required that they ensure 100% all of the risk scope, but it is required to provide a coverage degree (measured from zero to one) for each test. Furthermore, each test can be associated with multiple risks. $T_{ij}$ represents a test associated with the risk ($R_i$). The coverage degree could be different for the application of the same test across different risks. For this reason, the coverage degree has the representation $c_{ij}$. The coverage degree performed for each risk by the set of tests assigned to the risk $R_i$ is expressed as $c_{ij}T_{ij}$. The expression that describes the relationship between the set of tests and the risk that is covered by this collection is:

$$\{T_{ik}\} \in R_i$$

Test Inputs

The test definition requires a set of preconditions that manage the configuration for the test execution. The required elements to manage the configuration include one or more of: test identification (name and description), test type (e.g., Node, Java, API call to execute, parameters (names and values) passed to the API call, security parameters (e.g., user and password), condition for result checking, and log schema generated during the test execution.

Test Outcomes

Each test provides, once it has been executed, one or more of the following outcomes: evidence and activity logs produced during the test execution, test result ($r_{ij}$) that is a Boolean value, and the spent time ($t_{ij}$). The same test executed for different risks can conclude with different results and times, due for instance, to different decision conditions configured for the pair test-risk (parameters values, acceptance criteria, etc.).

Features and API

A risk must have a set of SSP functionalities that are affected by the risk content. The same functionality also can be affected by more than one risk. The representation of each functionality or API associated to a given risk ($R_i$) is $F_{ik}$. Thus, each feature can be functionally implemented through the source code of the software. Each feature can be related with a set of tests that check the functionality performed by the specific API. Thus for each $F_{ik}$, a set of tests $T_{ih}$ cover to some degree the specific feature (h tests) for the risk $R_i$. This condition is described as:

$$\forall F_{ik} \exists \{T_{ih}\} \in \{T_{ik}\} \in R_i$$

Feature Complexity

Each feature $F_{ik}$ is related to a set of features because it invokes or it is invoked by other features. Therefore, a parent-child relationship is established between features. Additionally, invocations can be performed by functions, methods, classes, objects or variables in a static or dynamic (for example by reflection) way.

Considering the following sets of related features of $F_{ik}$:

$$\forall F_{ik} \exists \{PF_{ih}\} | PF_{ih} \twoheadrightarrow F_{ik}$$

$$\forall F_{ik} \exists \{ChF_{ig}\} | F_{ik} \twoheadrightarrow ChF_{ig}$$

$$\forall F_{ik} \exists \{SF_{if}\} | F_{ik} \leftrightarrow SF_{if}$$

being $PF_{ih}$ parents of the feature $F_{ik}$ and allowing to have more than one parent per feature, being $ChF_{ig}$ the set of children invoked by the feature $F_{ik}$ and $SF_{if}$ defined as the set of all siblings shared with the feature $F_{ik}$ for all the parents $PF_{ih}$. The symbol $\twoheadrightarrow$ indicates "invocation" and the symbol $\leftrightarrow$ means "invoked by same invoker".

Considering that a parent $PF_{ih}$ could potentially invoke a specific feature $F_{ik}$ through a sub-structure contained in the own feature (function, variable, class, etc.), the total number of interactions established by a given parent $PF_{ih}$ over a child $F_{ik}$ is determined as:

$$In_{ik}(F_{ik}) = \sum_h PF_{ih} \cdot k_{ikh}$$

Where $k_{ikh}$ are the individual calls performed by $PF_{ih}$ over a child $F_{ik}$, and $In_{ik}$ is the total number of interactions between $PF_{ih}$ over $F_{ik}$. The measure of the complexity $X_{ik}$ associated to a specific feature $F_{ik}$ is expressed below:

$$X_{ik} = \frac{In_{ik}(F_{ik}) + In_{ig}(ChF_{ig}) + 1/2 \cdot In_{if}(SF_{if})}{\sum_h PF_{ih} + \sum_g ChF_{ig} \cdot + \sum_f SF_{if}}$$

Therefore, each feature $F_{ik}$ can be understood as a node measured by the number of parent invocations, child invocations, siblings, and complexity measured as $X_{ik}$.

When complexity is measured for each node $F_{ik}$, the associated risk identified as Ri can be calculated by adding a correction factor based on the complexity in this way:

$$R_i = R'_i + \rho \cdot \sum_k X_{ik}$$

The $\rho$ coefficient can be empirically adjusted or can be initialized following good quality practices.

Test Coverage by Risk

Each test ($T_{ij}$) associated with a given risk ($R_i$) is covering a percentage of the risk. Considering that the coverage for each test is defined as $c_{ij}$, the collection of coverages for a given risk satisfy this condition:

$$0 \le \sum_j c_{ij} \le 1 \forall i$$

Considering the best case where all tests associated to the risk cover the 100%, the expression is:

$$\sum_j c_{ij} = 1$$

The individual coverage of each test for a given risk considers the intersection among all the coverages associated with this risk. For this reason, the sum of all of them (for a given risk) cannot exceed 100%.

Test Coverage by Feature

Applying the same reasoning as the previous definition does, each test ($T_{ik}$) is associated to a given feature ($F_i$) and covers a percentage of the functionality. Considering that the test coverage for a specific feature is defined by $\gamma_{ih}$, the collection of coverages for a given feature satisfy this condition:

$$0 \le \sum_h \sum \gamma_{ih} \le 1 \forall i$$

Considering the best case where all tests associated to the risk cover the 100%, the expression is: $\Sigma_h \Sigma \gamma_{ih}=1$ The individual coverage of each test for a given feature considers the intersection among all the coverages associated with this feature $F_i$. For this reason, the sum of all of them (for a given feature) cannot exceed 100%.

Absolute Acceptance Test

The qualifiable output of each test is composed by a Boolean result (0 or 1) and spent time for the test. Tests can be defined as dependent on both concepts (result and time) or only based on the result. If the test considers both values to provide the acceptance for the execution follows this statement:

$$A_{ij}(T_{ij})=r_{ij} \cdot (1-|t_{ij}-t^0_{ij}|/t^0_{ij})$$

Where $A_{ij}$ is the acceptance test for the test $T_{ij}$, $r_{ij}$ is the Boolean result ($r_{ij} \in \{0, 1\}$), $t_{ij}$ is spent time in the test execution, and $t^0_{ij}$ is the expected time for the test execution. The previous expression is valid while the following condition is true:

$$t_{ij} \le 2 \cdot t^0_{ij}$$

Otherwise (when the test execution time is greater than twice the expected time), the absolute acceptance test will be considered negative.

Thus, $A_{ij}$ satisfies this statement: $A_{ij} \in [0, 1] \forall t_{ij} \le 2 \cdot t^0_{ij}$. Considering that each risk $R_{ij}$ has associated m tests (j=1 to m), the full risk acceptance is managed by the following expression:

$$A_i(R_i) = \frac{1}{m} \cdot \sum_{j=1}^{m} A_{ij}(T_{ij}); 0 \le A_i(R_i) \le 1$$

The expected time for the test execution ($t^0_{ij}$) will be simply named $t_0$.

Covered Acceptance Test

Each test covers a specific percentage ($c_{ij}$) of the risk for which the test is associated. Consequently, the acceptance test (execution of the associated qualification) covers the same ratio as the value of the variable $c_{ij}$. Therefore, the covered acceptance test ($C_{ij}$) for a given test is:

$$C_{ij}(T_{ij})=c_{ij} \cdot r_{ij} \cdot (1-|t_{ij}-t_0|/t_0)$$

The entire coverage for a risk with all its involved tests (considering that each risk $R_{ij}$ has associated m tests) is represented by the following sum:

$$C_i(R_i) = \sum_{j=1}^{m} C_{ij}(T_{ij}); 0 \le C_i(R_i) \le 1$$

Risk Score

Each risk has an associated priority (defined by $p_i$) assigned by the user. Based on the test results generated for the test execution engine, a risk score ($S_i$) can be defined through this expression:

$$S_i(R_i)=(p_i-P_{MAX}) \cdot C_i+P_{MAX}$$

Figure 2:
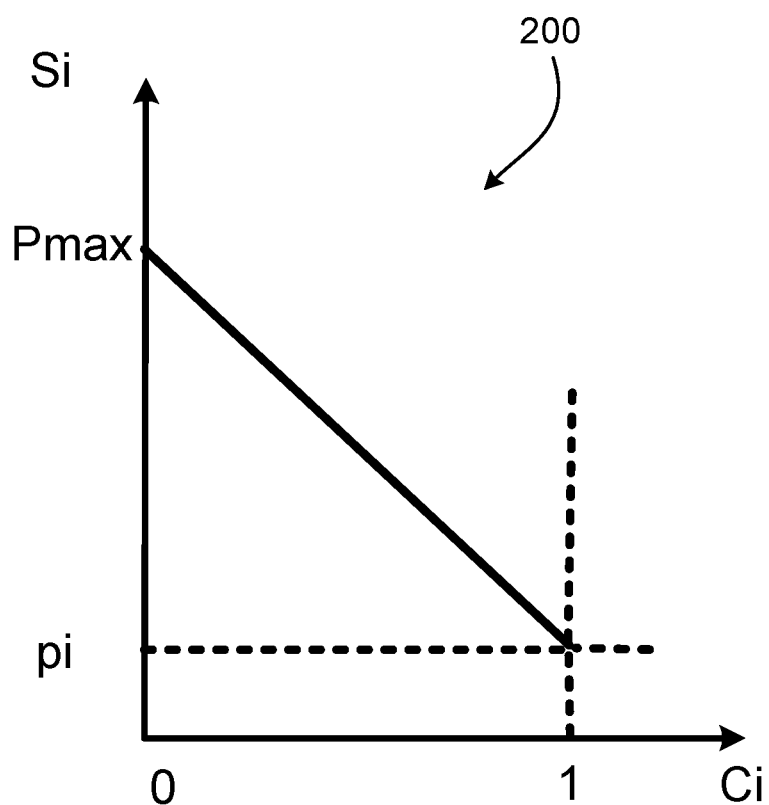
FIG. 2 is a graph showing an inverse relationship between the covered acceptance test $C_i$ and the risk score $S_i$ for a given risk $R_i$.

A risk score is better controlled the smaller its value. Considering for example the FMEA definition for the risk priority (Severity×Probability×Detection), the maximum priority for a given risk is alerting about the serious actions to take in order to minimize this risk. This reasoning is represented by FIG. 2, which is a graph 200 showing an inverse relationship between the covered acceptance test Ci and the risk score Si for a given risk Ri.

As illustrated in graph 200, that for a non-valid covered acceptance test ($C_i=0$) the risk score Si is maximum. In the contrary case, when the covered acceptance test is maximum ($C_i=1$), the risk score Si is the priority initially defined ($p_i$) for this risk. If this risk is well accepted systematically, the SQP will propose to reduce the assigned risk score. The goal for a well-qualified system is to minimize the risk score ($S_i$) and maximize the covered acceptance test ($C_i$).

Test Impact

A given test can belong to more than one risk and potentially can cover multiple features. The impact associated with a test ($I_i$) is a function that depends on the number of risks covered by the test and the number of features covered by the test. In some implementations, the test impact is calculated as the sum of all the individual risk scores (more risk implies more impact) and the sum of features associated with the risk where the test is present (more features implies more impact). The expression of the impact is described by this function:

$$I_i(T_i) = \lambda \cdot \sum_j S_j \cdot \sum_k F_k; \forall T_i \in \{R_j\} \land \forall T_i \in \{F_k\}$$

Where the risk score is a function of the risk ($S_j=f(R_j)$) and $\lambda$ is a constant defined for the entire set of risks.

The aim of the SQP is to minimize the value of the test impact for all the tests, thereby minimizing the risk score for the set of risks defined for the SSP. Replacing the risk score by the expression depending on its coverage, the test impact can be described as:

$$I_i(T_i) = \lambda \cdot \sum_j ((p_j - P_{MAX}) \cdot C_j + P_{MAX}) \cdot \sum_k F_k =$$

$$= \lambda \cdot \sum_j \left( (p_j - P_{MAX}) \cdot \sum_{h=1}^{m} C_{jh}(T_{jh}) + P_{MAX} \right) \cdot \sum_k F_k =$$

-continued $$= \lambda \cdot \sum_j \left( (p_j - P_{MAX}) \cdot \sum_{h=1}^{m} (c_{jh} \cdot r_{jh} \cdot (1 - |t_{jh} - t_0|/t_0)) + P_{MAX} \right) \cdot \sum_k F_k$$

Usage Impact

A measure of the platform usage by means of the direct user interaction through the UI or via REST call provides a variable to quantify the impact of a specific functionality. Therefore, the impact of system upgrades and new versions could also be automatically measured based on the user activity. Additionally, there are potential background jobs that are triggered by the user activity (e.g., integrity checks, cost calculation, audit trail, etc.). The automatic events produced as result of the user interaction are also considered as part of the impact weight. The usage impact (UI) can be calculated as a percentage figure based on the number of interactions (clicks, accesses, produced triggers, events, etc.) that a specific functionality has been called per unit of time. Therefore, the UI ($\Delta t$) is a function of the frequency used to take the user and system interactions and can be calculated through automatic mechanisms (no manual calculations are considered in this requirement). Usage impact is a time function calculated for a specific period of time that should be consistent along all measurements. The UI ($\Delta t$) function is built as a linear combination of two factors:

a) User actions rates (uap). User action rates is a factor that provides a weight associated with the usage of a specific feature i in the platform when users are interacting with the system. Only features accessible from the user perspective are considered as uap (e.g., graphical actions distributed through the user interface or API calls manually executed and directly associated to users). The indicator uap is constituted as a 3-dimensional vector with the following components (always considering the specific time-frame $\Delta t$):

$$uap=[n,m,cv]$$

Where each component of this vector is defined as follows:

n: is the total number of different users/actors accessing and interacting with the feature i during the time range $\Delta t$.

m: is the absolute number of interactions performed by the n users accessing the feature i during the time-frame $\Delta t$.

cv: is the coefficient of variation, defined as the ratio of the standard deviation to the mean of actions. It shows the extent of variability in relation to the mean of the actions executed by the total spectra of users during the time-frame $\Delta t$.

Therefore, if $x_j$ is the number of interactions performed by the user $n_j$, the absolute number of interactions and the total number of different users/actors are described by these expressions:

$$m=\Sigma n_j \cdot x_j \text{ and } n=\Sigma nj$$

Taking both definitions of n and m, the coefficient of variation cv is defined as follows:

$$cv = \frac{\sigma_m}{m}$$

b) System actions rates (sap). System action rates is a factor that provides the weight associated with the usage of a specific feature i in in the platform by the same platform as part of the internal functionalities required for its execution. Automatic options like scans, sanity checks, self-monitoring, automatic logs and audits, traceability records, or adjustments automatically performed by AI models are examples of this actions managed by the system without needed user interaction. This measure is performed following the same criteria as the uap and the indicator sap is constituted as a 2-dimensional vector with the following components (always considering the specific time-frame $\Delta t$):

$$sap=[m,cv]$$

Where each component of this vector is defined as follows:

m: is the absolute number of interactions performed by the system accessing the feature i during the time-frame $\Delta t$.

cv: is the coefficient of variation defined as the ratio of the standard deviation to the mean of actions in a given period of time. It shows the extent of variability in relation to the mean of the actions executed by the system during the time-frame $\Delta t$.

Therefore, if $x_j$ is the number of interactions performed in the period of time $\Delta t$, sap can be defined as the absolute number of interactions and the coefficient of variance for a specific time-frame:

$$m = \sum x_j \text{ and } cv = \frac{\sigma_m}{m}$$

Both measures always make reference to a given $\Delta t$.

Taking both vectors uap and sap as the indicators for the measurement of the usage of the SSP system, for a known functionality i, the usage impact expression is defined as follows:

$$UI_i(t) = \frac{\alpha}{m} \cdot \sum_{j=1}^{m} uap_j(t) + \frac{\beta}{n} \cdot \sum_{k=1}^{n} sap_k(t)$$

Based on the previous expression, the usage impact (UI) automatically calculated for a specific functionality i is based on two factors: i) the sum of all (m in total) the user actions rates (uap) and ii) the sum of all (n in total) the system action percentages (sap). The uap and the sap are vectors that measure the interaction between users and the platform and the platform with itself. For web environments where applications run within internet browsers, depending on the criticality of each kind of actions (user interactions or automatic in background associated with the user activity), the coefficients α and β allows the system to determine the specific weight of them in the usage impact.

Finally, the explicit time dependence requires a consistency of the time-frame where measures must be taken.

Global Usage Impact

The aggregation and normalization of the total amount of usage impacts for all the existing functions provide the global usage impact (GUI) measure considered per unit of time t:

$$GUI_i(t) = \frac{1}{m} \cdot \sum_{j=1}^{m} UI_j(t)$$

Risk Impact

This indicator (RI) calculated based on the average for the individual impact for each test by a given risk (considering m tests in a given risk):

$$RI_i = \frac{1}{m} \cdot \sum_{j=1}^{m} I_j(T_j)$$

Iteration

The term iteration refers to an entire execution of all the tests that belongs to the risk model. Considering the risk score, test impact, and the absolute and covered acceptance test measures, the elementary statistics (average, maximum, minimum, standard deviation) provide a global indicator for each measure in a specific iteration. Thus, considering an iteration with N risks, the following measures provide the aggregated information for the iteration:

Iteration score:

$$IS = \frac{1}{N} \cdot \sum_{i=1}^{N} S_i(R_i)$$

Iteration absolute acceptance:

$$IA = \frac{1}{N} \cdot \sum_{i=1}^{N} A_i(R_i)$$

Iteration covered acceptance:

$$IC = \frac{1}{N} \cdot \sum_{i=1}^{N} C_i(R_i)$$

IV. Required Functionalities Provided by the SQP

To calculate the terms defined in the previous section, the SQP must provide a set of functionalities with the information needed to calculate each expression. The expected functions return the following data based on the defined inputs:

Functions for Risk Models

For a given test ($T_{ij}$) associated with a risk ($R_i$), returns the set of risks where the test is involved. The same test can be associated with different risks, being characterized with different parameters or evaluations. The reverse functionality is also provided: for a known risk, SQP provides the associated tests. The test coverage degree is also informed, considering additional functions where the input is the coverage, for instance: get risks where the coverage is less than 50%.

For a given test ($T_{ij}$), returns the set of features ($F_{ik}$) included in the risks ($R_i$) covered by the test. The same test can be present in different features and the same feature can be covered by more than one test. The link between tests and features are the risks, although the relationship between tests and features can be established directly.

The reverse functionality is also provided: for a known feature, SQP provides the associated tests. Defining this function in a formal way, there is a function that returns the test set ($T_{ij}$) involved in the testing of a given feature ($F_i$) for any coverage degree such that $\gamma_{ih} > 0$. This function is defined as TSF (test set of a feature) and is described as follows:

$$TSF(F_i) = \{T_{ih}\} | \gamma_{ih} > 0$$

Functions for Test Execution

For a given risk ($R_i$), the system can determine an absolute acceptance test ($A_i$) and a covered acceptance test ($C_i$). Considering the relationship between features and risks, there is a function that provides the same information ($A_i$ and $C_i$) for a given feature ($F_{ij}$).

There is a set of functions that provides the aggregation result for the entire set of risks (result for a specific iteration). The outcomes generated by these functions are the global acceptance and the covered acceptance for an executed iteration. In addition, the statistics about the risk score (the average, maximum, or minimum) as the global impact as well.

Static and Dynamic Risk Map

The impact of each feature in the global behavior of the SSP can be established using a network map where each node corresponds with a feature. Features are characterized by static attributes (risk, impact, complexity, coverage) and by dynamic properties (calculated by means of the global usage index). The combination of both kinds of attributes provide a tensor that characterizes each node (Ni) based on the static and dynamic measurements:

$$N_i = (RI_i, GUI(t)_i)$$

Figure 3A:
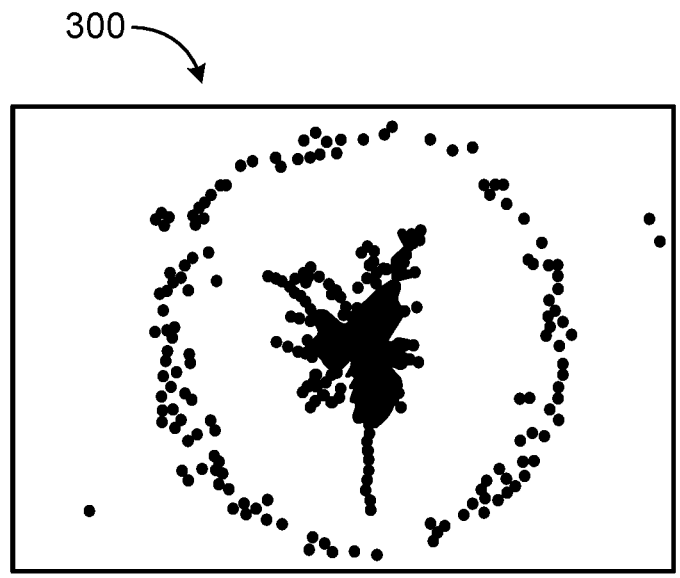
FIG. 3A illustrates a risk map of a full SSP system where each node represents a feature and its relationships with the called and caller functions.
Figure 3B:
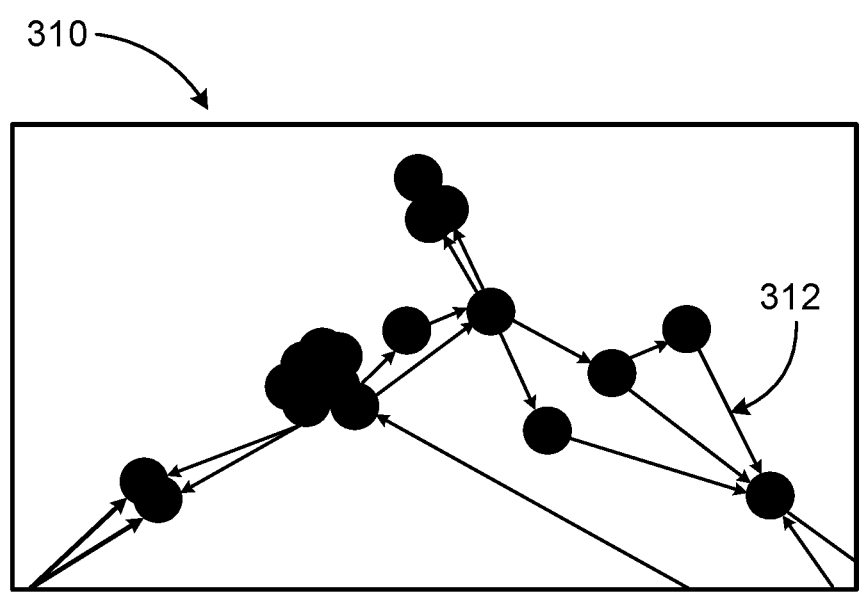
FIG. 3B illustrates a portion of the risk map showing detail of the directional nodes.

Taking into account that each set of attributes ($RI_i$ for static and $GUI(t)_i$ for dynamic measurements) are integrating and aggregating all the concepts described above in terms of risk, impact, coverage, complexity and feature usage, the network map built by all the nodes that match with the individual functionalities $F_i$ implemented in the SSP becomes a tool that describes the SSP system from a risk perspective. For this reason, the static and dynamic risk map will be mentioned henceforth as Risk Map. FIG. 3A illustrates a risk map 300 of a full SSP system where each node represents a feature and its relationships with the called and caller functions. Isolated nodes are neither called nor calling any other feature. FIG. 3B illustrates a portion 310 of the risk map 300 showing detail of the directional nodes. Some links, e.g., links 312 indicate high risk based on the threshold and expressions defined by Ni.

Risk and Impact for a Given Feature $F_i$

The exposed API REST interface of the SQP provides the following support methods:

GetNodeRisk, GetNodeImpact, GetNodeUsage. Provide the risk, impact and usage respectively for a specific feature $F_i$ considering only the specific node passed as parameter.

GetExtendedRisk, GetExtendedImpact, GetExtendedUsage. Calculate the risk, impact and usage respectively of a specific node considering the parents and children nodes risk, impact and usage and their own node as well.

GetRiskBetweenNodes, GetImpactBetweenNodes, GetUsageBetweenNodes. For a couple of nodes, the SQP calculates the shortest path between them and calculates the risk, impact and usage of all the nodes involved in the path. If nodes are isolated, the calculations are based on both nodes.

Risk Impact ($RI_j$) and Global Usage Impact ($GUI(t)_i$) are measures that have been calculated from other magnitudes described above. API REST calls providing details of the individual measures used to calculate $RI_j$ and $GUI(t)_i$ are assumed as well following the structures: GetNodeXX, GetExtendedXX and GetXXBetweenNodes.

V. Recommender Engine

The aim of the recommender engine is to provide personalized suggestions to test the platform with the ultimate goal of successfully completing the qualification. In order to do it, the SQP uses its own measures of risk described above along with additional measures of user feedback and impact ($UI(\Delta t)$) regarding the test suggestion. The recommender engine is based on the test set that covers a specific functionality previously introduced as $TSF(F_i)$. For each feature $F_i$ that is exposed to the users, there is a set of tests $\{T_{ih}\}$ that works with a specific coverage degree. When users interact with the platform they perceive the efficiency of the functionalities and, indirectly, the test set $\{T_{ih}\}$ that has been used for its verification. This assumption is used to establish a recommender system.

The underlying concept behind the recommender engine is based on establishing a U×T matrix where U are the users of the system and T the specific test set covering a given feature $F_i$ (i.e., tests of a functionality F in any form included in $\{T_{ih}\}$). Each cell of the matrix [u, t] can contain a rating $r \in R$ st. $0 \leq r \leq 1$ representing the grade that a user u "assigns" to a test t that has been successfully executed through the satisfaction degree of the used functionality. The matrix U×T can then be used to recommend previously executed tests by taking the top-k ratings of a user u, or more importantly, infer the ratings of a user's unexecuted tests by the usage of user-based collaborative filtering techniques, described below, which are based on the premise that similar users will execute similar tests.

User Feedback

Instead of exclusively using an explicit rating system based on asking the user's direct feedback, the measures of risk are aggregated along with alternative sources of feedback in order to create a more accurate and customized rating r (for example, as described in Tintarev and Masthoff, A survey of explanations in recommender systems. Proceedings—International Conference on Data Engineering, (May):801-810 (2007), incorporated here by reference). Here three main types of feedback are considered: implicit feedback, explicit feedback, and context features. The implicit feedback corresponds to the activity that the user performs while running the feature $F_i$. In the recommender engine, the system can consider one or more of these implicit feedback features:

Number of views of the solution.
Dwell Time (i.e., the time spent on the test).
Total distance travelled by the mouse cursor.
Total mouse in motion time.
Total scrolled distance.
Scroll Time (i.e., the time spent by scrolling).
Clicks count (i.e., the volume of mouse clicks)
Test completed (i.e., binary information whether the user completed the test).

The context features exclusively describe the set of graphic elements related to the suggested test and can include one or more of:

Page dimensions (width, height).
Browser visible area dimensions (width, height).
Volume of text, images and links on the page.
Visible area ratio.
Hand-held device indicator.

If necessary the explicit feedback can be captured as well, although there are many different ways to do it, the SQP assumes that users will introduce the input rating by a scoring system (for instance using stars, smile icons).

Rating

This multimodal input, namely $i_1, i_2, \ldots, i_n$, is transformed into a single numeric output o, which can be viewed as a proxy for the user rating r. The straightforward transformation relies on establishing a predefined set of coefficients $c_1, c_2, \ldots, c_n$ in order to perform a sort of weighted average (e.g., as described in Peska, Multimodal implicit feedback for recommender systems. CEUR Workshop Proceedings, 1885:240-245 (2017) incorporated here by reference). Thus, the rating r can be represented as:

$$r = \sum_{j=0}^{n} c_j \cdot i_j \text{ where } 0 \leq c_j \leq 1 \text{ and } \sum_{j=0}^{n} c_j = 1$$

Since the only measurable feedback with direct interpretation of preference is completing a full feature, a classification task to determine, through supervised learning, whether the execution will be completed by the user is defined instead. The estimated rating is then defined as the probability of the action being completed:

$$o = g(f(i,h)), g(f(i,h)) = 1 \text{ if } f(i,h) > l \text{ else } 0$$

Where,
h is a set of hyperparameters;
f is the model function that computes the probability of completing the feature given i; and
g is the decision function that determines the class according to the threshold l.

Training of a classifier in a supervised way usually proceeds by means of an optimization algorithm, which is given a training set with desired outputs and a loss function that measures the discrepancy between the classifier's outputs and the desired outputs. Thus, the learning algorithm solves an optimization problem of the form:

$$\operatorname{argmin}_h R(h) + C \sum_{j=0}^{n} L(o_j, g(f(i_j)))$$

Where, $L(o_j, g(f(i_j)))$ is a loss function that measures the discrepancy between the classifier's prediction $g(f(i_j))$ and the true output $o_j$;

$R(h)$ is a regularization function that prevents the parameters from getting too large (causing overfitting); and C is a scalar constant that controls the balance between the regularization and the loss function.

A common loss function for continuous functions is the quadratic loss function where least squares techniques are applicable (t is the target):

$$L(x) = C(t-x)^2$$

Because the recommender engine is based on decision theory and executed functions could not be ensured that work as a continuous function does, the 0-1 loss function is more adequate for this scenario:

$$L(\hat{y}, y) = I(\hat{y} \neq y)$$

Where $I(y)$ is the indicator function. This approach requires an existing set of completed features (and therefore a subsequent test set given by $TSF(F_i)$) in order to train the model. This is typically referred to as a cold start problem. To solve this constraint, the SQP will use a simple rank approach based exclusively on the measures of risk until a significant number of samples is obtained.

Collaborative Filtering

Given an active user u, and a test t that the user has not previously executed by executing an action, the main goal of user-based collaborative filtering is to estimate the rating r that u would most likely assign to t (see, e.g., Herlocker et al, Explaining collaborative filtering recommendations. In Proceedings of the 2000 ACM Conference on Computer Supported Cooperative Work, CSCW '00, pages 241-250 (2000), incorporated here by reference). The basic collaborative filtering can include the steps of:

1. Finding a set of peers $P_{u,t}$ that show a similar behavior of the platform as the active user u, and that have completed the execution of the test t by executing one or more features that are covered in some proportion by the test t.
2. Estimating the rating of t by means of an aggregation function (e.g., weighted average) taking all the ratings from $P_{u,t}$.
3. Repeating the process for all the tests that u has not executed because no actions covered by the test t have been called, and recommend the best-rated.

To find similar users to u requires a similarity measure, which is a critical step of the algorithm. The main idea in similarity computation between two users v and w is to first isolate the set of tests commonly rated by both users, and then to apply a similarity computation technique to determine the similarity. In general, the Pearson Correlation is used as a similarity measure because of the bias adjustment effect of mean-centering (see, e.g., Goldberg et al. Using Collaborative Filtering to Weave an Information tapestry. Communications of the ACM, 35(12):61-70 (1992), incorporated here by reference). This similarity measure can be expressed as:

$$\text{sim}(v, w) = \frac{\sum_t \in T(r_{v,t} - \bar{r}_v)(r_{w,t} - \bar{r}_v)}{\sqrt{\sum_t \in T(r_{v,t} - \bar{r}_v)^2} \sqrt{\sum_t \in T(r_{w,t} - \bar{r}_v)^2}}$$

When two users have very few completed tests in common, the reliability of the similarity score is low. In this case, the similarity score should be reduced with a discount factor D to de-emphasize the importance of that user pair. This is called Significance Weighting:

$$\text{sim}_c(v, w) = \text{sim}(v, w) \times \frac{\min(D, |T_v \cap T_w|)}{D}$$

It is important to note that users will score the test effectiveness by means of the normal activity usage in the platform, providing the associated rate by means of a scoring specifically designed for this purpose.

Weakly correlated users might add to the error in the prediction, moreover, negative correlations often do not have a predictive value. That is why the option top-k most similar users to user u for the test t is used by the system for the calculation in order to do the prediction. The rating $r_{u,t}$ is then estimated from the neighbor's rating in the following way:

$$r_{u,t} = \frac{\sum_v \in P_{u,t} \text{sim}_c(u, v) \times r_{v,t}}{\sum_v \in P_{u,t} \text{sim}_c(u, v)}$$

VI. Description of the Qualification Process

The process followed by the SQP to qualify any application that matches with the assumptions and requirements described above is detailed in the sequence described below and represented by the FIG. 4.

Figure 4:
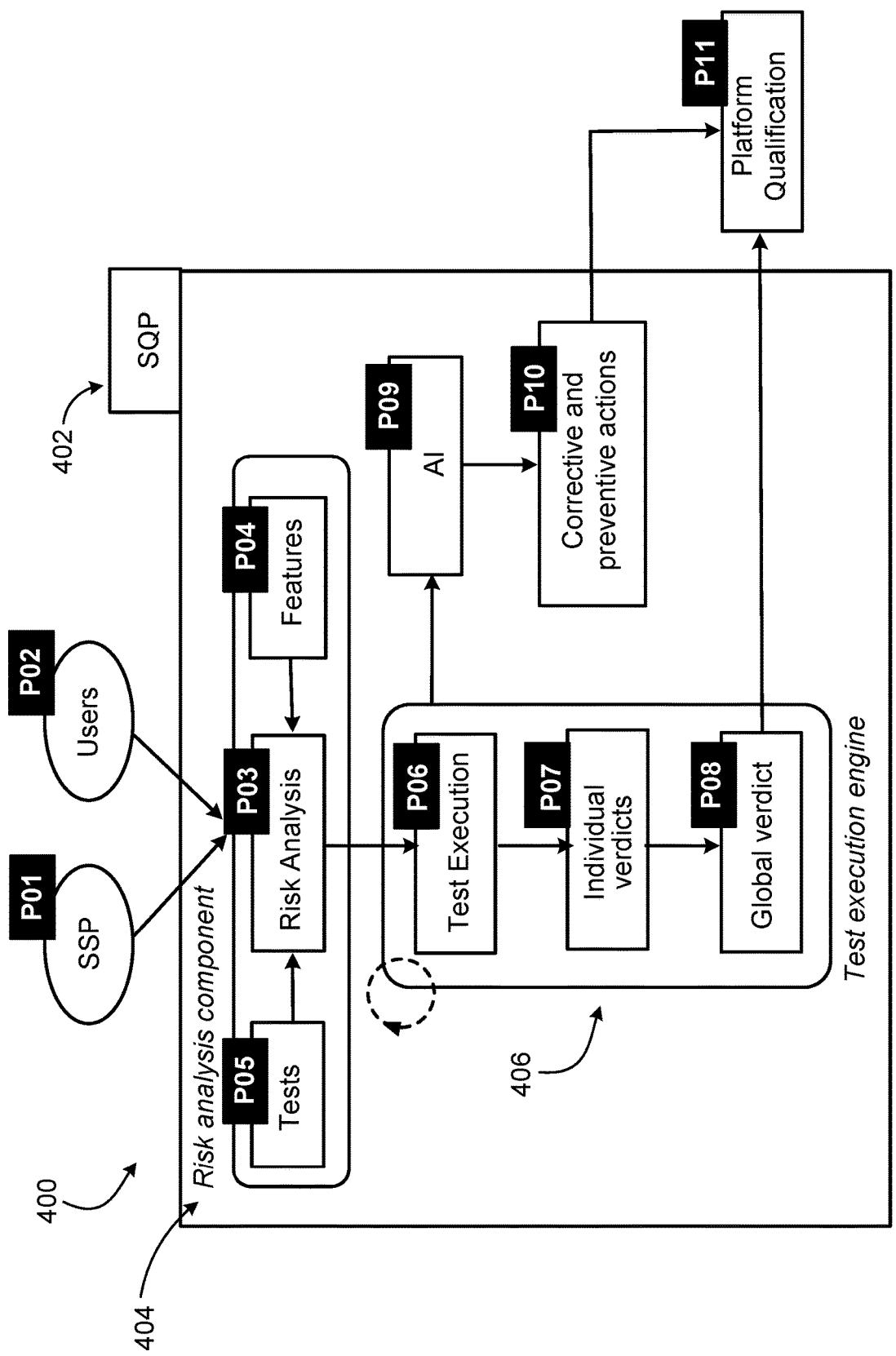
FIG. 4 illustrates an architecture based on a standard software platform that offers features for regulated environments working in cloud and managed by the proposed qualification engine.

FIG. 4 illustrates an architecture 400 based on a standard software platform that offers features for regulated environments working in cloud and managed by the proposed qualification engine. Furthermore, FIG. 4 further illustrates steps of a process for performing qualification. For convenience, the steps in process will be described as being performed by a system of one or more computers, located in one or more locations, and programmed appropriately in accordance with this specification. The process is subdivided in phases identified by a sequential index PXX:

P01. The SSP works as an external application to the SQP 402. The SSP is based on cloud technologies with the requirements described previously. The SSP is able to perform external calls to the SQP 402 using, e.g., REST calls. The mission of this process is to publish the list of associated risks in using the SSP as well as the related features with each risk and the tests that are covering them.

P02. Users can add their own risks, features, and tests, and the relationships between them. For a given environment where the user is properly authenticated, the available risks, features and tests are only those that have been defined for the environment that the user belongs to. Users belonging to different environments cannot access the information generated in other environments. The users can interact with the SQP 402 through the GUI or by means of API calls.

The specific activity performed by the users utilizing the SSP system is also being used to measure those actions that must be taken for the risk assessment consideration automatically. The same occurs with the automatic actions performed by the SSP without user interaction (data transfer, maintenance activities, etc.). When the SSP presents the ability to communicate these tasks to the SQP, the risk assessment is more complete and reliable.

Finally, the user has the ability to assign, inside the SQP, the impact and severity assessment for specific SSP features. The impact categories can be customized (for instance, user interface, kernel, configuration, master data, etc.). The severity classification is based on the following classes: critical, high, medium, low.

The scoring assigned to the SSP functions (and consequently assigned to tests covering the features) by users are used by the SQP 402 to provide recommendations.

P03. The SQP 402 includes risk analysis component 404. The risk analysis component manages the set of risks fed by the SSP and/or the users with access to the SQP 402 and performs risk analysis P03 based on features P04 and tests P05. Each risk is defined by a code, description, and an evaluation that follows the FMEA criteria (the fields severity, probability and detection define the priority). Other fields and criteria can be included, but the FMEA is one of the most standard ways to establish the risk score based on three levels (low, medium and high))(see, e.g., Analysis Techniques for system reliability—Procedures for failure mode and effects analysis (FMEA), number IEC 60812: 2006(E) International Electrotechnical Commission (2006), incorporated here by reference).

P04. Each risk has a set of features that are being evaluated under the risk definition. The features are specific functionalities (for instance, API calls, methods, processes, algorithms, etc.) associated with the SSP that must be qualified. The same feature can belong to more than one risk. In addition, generic features can be added without SSP interaction. Thus, the SQP 402 can also qualify generic processes managed by risks.

When features are directly related with methods and algorithms linked to source code, the feature can be directly associated with the physical code through the repositories where they are located. For example, in revision control systems for technology environments, a repository is an on-disk data structure that stores metadata for a set of files and/or directory structure. The main purpose of a repository is to store a set of files, as well as the history of changes made to those files. Thus, a feature can be managed by the method or function implemented in a source code. The SQP 402 can automatically detect the performed updates (repository functionality) and provide this information to the system in order to manage the risks depending on the status of the method. The activity associated with the source code update will be detailed forward. By means of this process, the SSP and/or the user can parametrize properly the functionalities that must be involved in the qualification.

P05. The risk definition requires a set of tests that should cover the risk by a given percentage (100% means that a set of tests are covering perfectly the risk). The same test can belong to more than one risk. To define a test associated with a given risk, it is necessary to describe it and identify it by a unique identifier (the same test code can be repeated for different risks). The test definition is parameterized with a structure as described above. Under an optimized framework, the test definition should include the call that drives the test execution (that will be performed always in the SSP). Nevertheless, generic tests (for instance, manual tests, theoretical checks or personnel verifications) can be included in the system although they do not have correspondence with any API call or they are only abstract concepts. Additionally a test can be executed in the own SQP uploading the code that must be executed in the cloud. The source code associated with the test must be self-contained and different programming languages are allowed. The collection of tests for each risk can be grouped to define a specific execution order, an asynchronous behavior or both.

The SQP 402 also includes a test execution engine 406 that performs test execution P06, renders individual results P07, and global verdict P08.

P06. Each test can be characterized by an API call (from which the execution will perform some action) or by a piece of source code. From any of those configurations, the test will run executing the associated action. If there are not APIs or scripts to be executed, the test can be considered as conceptual (or manual). The test execution definition is configured as described above. This process executes for each risk, the set of associated tests. The test result and the produced log will be gathered in the SQP. The time spent for the test execution will be calculated and included in the test results by the SQP. The return of each test execution can produce different answers. The user has the responsibility for the handling of the log response. In the test configuration and using the syntax provided by the SQP, the answer of the REST call performed for each test execution can be managed to extract the required log section. There is only one simple requirement to meet: the answer must be a JSON. The expected value for the result must be a Boolean or any value of a Boolean representation. Additionally, the configuration allows for defining a syntax that converts the output of the execution to the expected log structure. When the test is executed, the output is caught and analyzed in order to get the content exported by the execution and save it in the SQP's trace.

P07. Each execution test finalizes with three possible types of results: test executed ok, ko (not ok), or test not executed (this latest behavior could be produced for instance by a connection error resulting in the test not finishing properly). The format of the output produced by the execution follows a structure as defined above. When the node result is present in the response and contains a Boolean value (or any Boolean representation in numerical or string format), the result is associated with a new iteration of the test linked with the risk, considering that the same test might be related to more than one risk. If the test is not properly executed (no values are present for the result node or it is different from an expected Boolean), the iteration is considered as failed without result. This information and the associated log is saved individually, ensuring the total traceability along the iteration.

P08. The results produced by each test execution is accumulated by the SQP to provide a global verdict about the current iteration. The output of an iteration contains the detail and a summary about the execution of the set of tests. The result is also saved as part of the total traceability. The individual information produced during the test execution and the aggregated records associated to the iteration will be used in the machine learning process in order to suggest new risk models.

P09. The SQP 402 has the ability to propose a risk model based on the individual and the aggregated acceptance test provided by the recommender engine, applying the respective coverage, score and impact for each risk described above. The proposed algorithm is based on reinforcement learning, where the input are the test results (considering the absolute and the covered result) and the initial configuration proposed by the user. The output is the risk level associated with the global iteration outcome.

The Artificial Intelligence process is based on a recommender algorithm fed by the statistical elements involved in the qualification process. The algorithm presents a learning mechanism based on the classic definition of nodes and weights for a reinforced learning method. The SQP proposes the optimal model for the acceptance criteria based on the indicators described in the elements and terms involved in the qualification process. Therefore, human feedback (for instance human comments or automatic record of the user activity) or automatic events performed by the SSP, supply the raw information to feed the recommender engine system. The detail of the used algorithm is described above.

P10. Based on the results of the accumulated iterations, the SQP 402 is able to learn about the individual and the aggregated acceptance tests, applying the respective coverage, score and impact for each risk. The SSP usage determines the criticality of its own features depending on the utilization, frequency, impact and severity. The SQP provides a corrective and preventive actions (also known as CAPA) mechanism that offers the needed measures to mitigate risks for the identified features. The CAPA functions lay on the weight inherent to each node of the SSP that is represented by each individual feature. Therefore, each feature is part of a net connected through the relationship established by the calls (caller feature and called subfeature) performed when actions are triggered. The complexity associated with each feature (identified in this specification as $X_{ij}$) determines what elements are affected by specific actions managed by users or launched internally. Therefore, the nodes identified by individual features, are part of the latticework created by the chained calls between functionalities. The corrective and preventive actions are directly linked with the set of features that are called or work as caller (see, e.g., Chow, Testing software design modeled by finite-state machines. IEEE Trans—actions on Software Engineering, SE-4(3):178-187 (1978), incorporated here by reference).

P11. The platform qualification is a continuous status available in real time that provides the level of reliability in terms of functional integrity given by the defined collection of tests, the declared set of features and the continued usage of the platform identified by SSP. The qualification process aggregates the risk measurement applied to the entire set of features based on the risk calculated from the results gotten through the test execution. The ratio between the risk (aggregated by set of features), the usage performed of the involved functionalities and the coverage level establishes the qualification of SSP by the SQP.

One of the innovations provided by this proposal is the capability of calculating the qualification state based on any interaction produced on the SSP. Upgrades, patches, new releases, external interactions through API calls, user interaction and activities performed by the own platform are examples of different actions that are being measured by the SQP in real time in order to keep the SSP qualification. Furthermore, the preventive actions and recommendations derived from the calculations described above, supply the needed mechanisms to keep the SSP properly qualified in an automatic way. For example, based on the reported results of the tests, the risk metrics can lead an SSP owner to carry out particular actions including, e.g., halting a new release of a software version, or releasing the software version knowing the potential risks of malfunction.

Finally, the SQP accepts human feedback from the recommendations and preventive actions suggested by the platform. Human reactions are automatically added to the AI system, being part of the adjustment for the existing AI models in order to update them with new data. The models are continuously refactored in order to include this feedback as part of the supervised learning that allows for continuously improving the scoring of the AI output.

Regulatory Considerations

The recognized GAMP® 5 guidance, along with the GAMP® Good Practice Guide on IT Infrastructure Control and Compliance, is a set of guidelines that offer practical indications for software development that is required to work in regulated environments. The SSP must be developed under a GAMP 5 based quality system in order to meet with the expected regulatory requirements. In the same way, the risk assessment elaborated along the document must be based on the accepted guidance described by the existing GAMP (see, GAMP Guide: Records & Data Integrity. Published by ISPE, March 2017, incorporated here by reference). These guides have been addressed to analyze computerized systems and their main principles have been reflected in this proposal. GAMP is the acronym of Good Automated Manufacturing Practice. Under this concept, there is a set of guidelines for manufacturers and users of automated systems in the pharmaceutical industry (more information in http://www.ispe.org/gamp-5).

Other specific requirements are defined by different regulatory needs as for instance the electronic records management by pharma applications, described by the 21 CFR 11 Guideline (Guidance for Industry Part 11, Electronic Records; Electronic Signatures—Scope and Application. U.S. Department of Health and Human Services Food and Drug Administration. August 2003, incorporated here by reference).

VI. Standard Structures to Manage the Qualification Process

Based on the needed elements described in this specification, the qualification process performs the set of assigned tests, executing a loop for all the defined risks. Each test execution can have a structure that follows this example schema (JSON format):

{
  RiskID,
  RiskDescription,
  Priority, // Provided by $p_i$
  context, // Indicates the environment where the risk is contextualized
  Tests:
  [
    {
      TestID,
      TestDescription,
      TestCoverage, // Provided by $c_{ij}$
      ExpectedTime, // Provided by $t_0$. This value is managed using a ∂ that allows us to define a valid interval. If $t_0$ is not defined, only the result $r_{ij}$ will be considered.
      RESTCall: {//Needed parameters to perform the REST call (url, parameters, authentication, etc.)},
      ResultEvaluation: {//Syntax to analyze the answer received from the REST call that allows to extract the result},
      LogEvaluation: {//Syntax to analyze the answer received from the REST call that allows to extract the log content},
      ExpirationTime, // Maximum time expected to receive the answer.
      Repetitions, // Times that the test must be executed
      ElapsedTime, // When test is repeated, the time to wait between calls
      isAsynchronous, // When no order is required, the test can be executed asynchronously. The default value is true.
      Order, // If a sequential order must be kept, it is indicated using this node. If no order is indicated, the test is executed in parallel with the rest of tests without defined order. This field presupposes that isAsynchronous takes the false value.
Result, //Boolean value with the result calculated from the ResultEvaluation node or just directly assigned
StartTime, //UTC timestamp where the test starts
EndTime, //UTC timestamp where the test ends
Duration //Alternative when StartTime and/or EndTime does not exist
    },
    ( ... )
]
}

The risk model allows for the creation of groups of tests inside a given risk considering that each group has specific properties affecting the behavior of the execution. Therefore, a set of tests can be executed in a specific order or might be asynchronously executed. When no groups are defined for a risk, all the tests are executed supposing the following criteria:
1. If some of the tests has the isAsynchronous property with the default value true (although there were other tests with the contrary value or with the Order property not null, the asynchronous behavior is mandatory).
2. If any test is defined as asynchronous means that all the tests have to be executed in a specific order. If the order is wrongly defined (repeated order, missing order or nonconsecutive order), the system keeps the order for the tests that have been properly defined and the rest of tests are executed afterwards in an arbitrary order.

When groups are defined for a given risk, the structure can follow this example schema:
{
RiskID,
RiskDescription,
Priority, // Provided by $p_i$
context, // Indicates the environment where the risk is contextualized
Groups:
[
    {
    GroupID,
    GroupDescription,
    isAsynchronous, // When no order is required, the test can be executed asynchronously. The default value is true, which means that no order is defined.
    Tests:
    [
        {
        TestID,
        TestDescription,
        TestCoverage, // Provided by $c_{ij}$
        ExpectedTime, // Provided by $t_0$.
        RESTCall: { },
        ResultEvaluation: { },
        LogEvaluation: { },
        ExpirationTime,
        Repetitions,
        ElapsedTime,
        isAsynchronous,
        Order //This field only makes sense when group is not asynchronous
        Result, //Boolean value with the result calculated from the ResultEvaluation node or just directly assigned
        StartTime, //UTC timestamp where the test starts
        EndTime, //UTC timestamp where the test ends
        Duration //Alternative when StartTime and/or EndTime does not exist
        },
        ( ... )
    ]
}
}

The obtained result for each individual test execution is wrapped with the risk information where the test is linked. Thus, the resulting test execution can only be formed when all tests belonging to a given risk have been performed and the risk information has been calculated. The structure follows the next structure (JSON format):
{
RiskID,
RiskDescription,
Priority, // Provided by $p_i$
RiskScore, // Provided by the expression $S_i(R_i)$
RiskAcceptance, // Provided by the expression $A_i(R_i)$
CoveredAcceptanceRisk, // Provided by the expression $C_i(R_i)$
Context, / Indicates the environment where the risk is contextualized
GroupID, // Only present if this test was included in a group
GroupDescription, // Only present if this test was included in a group
TestID,
TestDescription,
TestCoverage, // Provided by the expression $c_{ij}$
AbsoluteAcceptanceTest, / Provided by the expression $A_{ij}(T_{ij})$
CoveredAcceptanceTest, // Provided by the expression $C_{ij}(T_{ij})$
TestImpact, / Provided by the expression $I_i(T_i)$
Repetition, // Sequential execution number for current test call
Order,
RESTCall, {// Called REST call (url, parameters, authentication, etc.}, Result, //Boolean representation that could take the values: OK, KO or NE (Non executed or error during parsing). This value is produced as the result of the parsed expression coming from the REST call.
InternalError, I/Contains an array of errors produced during parsing or executing the REST call (e.g., connection errors, not execution by time expiration, etc.)
EventLog, //JSON representation with the parsed log from the REST call
SpentTime, Time spent to execute the REST call
Start, Timestamp when the REST call is performed
End, Timestamp when the result of the REST call is received
}

Once the set of tests associated to a given iteration have been executed, the results and logs belonging to the aggregated information can follow this example schema (JSON format):

```
{
  IterationID,
  Context, // Indicates the environment where the risk is contextualized
  IterationScore, // Provided by the expression /S
  AbsoluteAcceptanceIteration, //Provided by the expression /A
  Covered acceptance iteration, // Provided by the expression /C
  AffectedRisks:
    [ // List of related risks involved in the current iteration.
      {
        RiskID:
        Priority, // Provided by p_i
        RiskScore, // Provided by the expression S_i(R_i)
        RiskAcceptance, //Provided by the expression A_i(R_i)
        CoveredAcceptanceRisk, // Provided by the expression
        C_i(R_i)
        UsageImpact, //Provided by the expression GUI(t)_i,
        Complexity //Given by ρ · Σ_k X_{ik}
        Groups: // Only present if this test was included in a group
        [
          Tests:
          [
            // List of executed tests for current RiskID and
            group if present,
          ]
        ],
        Features: [// List of features associated to the current
        RiskID ]
      },
      ( ... )
    ]
  AffectedTests:
    [ // List of executed tests for current iteration and result
      {
        TestID,
        Result
      },
      ( ... )
    ]
  Result, //Boolean representation for the total iteration that could take the values:
  OK, KO or NE (Non executed or error during parsing). This value is produced when a
  global error provokes that the iteration cannot be executed.
  InternalError, //Contains an array of errors produced during parsing or
  executing the REST call (e.g., connection errors, not execution by time expiration,
  etc.)
  EventLog, //JSON representation with the parsed log from the REST call
  SpentTime, //Time spent to execute the REST call
  Start, //Timestamp when the REST call is performed
  End, //Timestamp when the result of the REST call is received
}
```

Embodiments of the subject matter described in this specification include methods and corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following embodiments are also innovative:

Embodiment 1 is a method comprising analyzing, by a self-qualified process (SQP), a set of risks for a cloud based software platform, wherein each risk comprises a set of features that are being evaluated according to a risk definition; performing, by the SQP, one or more tests related to one or more risks of the set of risks; and based on an outcome of each of the tests, generating a measure of a qualification state for the cloud based software platform, wherein the measure of the qualification state is used to determine self-qualification of the software platform.

Embodiment 2 is the method of embodiment 1, wherein the measure of the qualification state is an indication that the structures associated with the software platform under analysis satisfy particular criteria.

Embodiment 3 is the method of any one of embodiments 1 through 2, wherein analyzing the set of risks comprises evaluating software of the software platform for potential malfunctions of particular features, wherein each risk has a set of features and a score, and wherein each risk is associated with one or more tests that cover a specified percentage of the risk.

Embodiment 4 is the method of any one of embodiments 1 through 3, wherein each test has a test impact that is a function that depends on a number of risks covered by the test and a number of features covered by the test, wherein minimizing the test impact values thereby minimizes the risk scores for the set of risks defined for the software platform.

Embodiment 5 is the method of any one of embodiments 1 through 4, wherein each test checks specific functionalities of the software platform and comprises a script or piece of source code isolated from the software platform that allows the SQP to verify a feature of the software platform based on particular conditions and test results.

Embodiment 6 is the method of any one of embodiments 1 through 5, wherein results of each test performed by the SQP are accumulated to generate an overall output for a current iteration, wherein the overall output is used to generate the measure of the qualification state for the software platform.

Embodiment 7 is the method of any one of embodiments 1 through 6, further comprising generating a recommendation of one or more tests that cover the set of risks based on ratings representing grades assigned by users to previously executed tests that have been successfully executed.

Embodiment 8, is the method of any one of embodiments 1 through 7, further comprising receiving feedback collected from users of the software platform; applying machine learning to the feedback to assess a real utilization of the software platform; and generating one or more recommendations based on the machine learning output, wherein the recommendation identify paths of functionalities of the software platform most called by users.

Embodiment 9 is a system comprising one or more computers and one or more storage devices storing instructions that are operable, when executed by the one or more computers, to cause the one or more computers to perform the method of any one of embodiments 1 to 8.

Embodiment 10 is a computer storage media encoded with computer program instructions that when executed by one or more computers cause the one or more computers to perform the method of any one of embodiments 1 to 8.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

analyzing, by a self-qualified process (SQP) as part of a software as a service architecture and distinct from a cloud based software platform, a set of risks for the cloud based software platform, wherein the SQP is configured to qualify a plurality of unique software platforms that are required to be qualified, wherein each risk comprises a set of features that are being evaluated according to a risk definition, and wherein the set of features correspond to specific functionalities associated with the software platform that need to be qualified, and wherein qualification defines an assurance that a subject system is achieving expected acceptance criteria defined by particular quality attributes and parameters;

performing, by the SQP and on the software platform, one or more tests related to one or more risks of the set of risks, wherein the one or more tests for each risk are configured to cover the risk of the set of risks by a specified percentage, and wherein each test comprises a parameterized test definition, wherein each test is associated with a given risk and covers a particular percentage of the risk, and wherein each test is also associated with a given feature of the software platform and covers a particular percentage of the functionality of the given feature, such that a traceability matrix is determined having the dimensions of: risk definition, risk score, set of tests covering each risk, and set of features that are affected by each risk; and generating an overall measure of a qualification state for the software platform, wherein each test output is associated with an acceptance test for the test that represents a corresponding measure of the qualification for a corresponding feature of the software platform, wherein the measure of the qualification state is based on an aggregated acceptance test output of the one or more tests, an aggregated risk calculated for the set of features, and a usage impact for the functionalities of the set of features, wherein the usage impact is calculated for each functionality based on user actions rates and system actions rates during execution of the corresponding feature, wherein the measure of the qualification is used to determine self-qualification of the software platform.

2. The method of claim 1, wherein the measure of the qualification state is an indication that the structures associated with the software platform under analysis satisfy particular criteria.

3. The method of claim 1, wherein analyzing the set of risks comprises evaluating software of the software platform for potential malfunctions of particular features, wherein each risk has a set of features and a score, and wherein each risk includes a numerical priority value assigned by one or more users of the software platform.

4. The method of claim 1, wherein each test has a test impact that is a function that depends on a number identifying multiple risks covered by the test and a number of features covered by the test, wherein the SQP operates to minimize the test impact values thereby minimizes the risk scores for the set of risks defined for the software platform.

5. The method of claim 1, wherein each test checks specific functionalities of the software platform and comprises a script or piece of source code isolated from the software platform that allows the SQP to verify a feature of the software platform based on particular conditions and test results.

6. The method of claim 1, wherein results of each test performed by the SQP are accumulated to generate an overall output for a current iteration, wherein the overall output is used to generate the measure of the qualification state for the software platform, the method further comprising:
generating recommended tests based on the results of the current iteration; and
performing at least one additional iteration using comprising execution of one or more of the recommended tests.

7. The method of claim 1, further comprising generating a recommendation of one or more tests that cover the set of risks based on ratings representing grades assigned by users to previously executed tests that have been successfully executed.

8. The method of claim 1, further comprising:
receiving feedback collected from users of the software platform;
applying machine learning to the feedback to assess a real utilization of the software platform; and
generating one or more recommendations based on the machine learning output, wherein the recommendation identify paths of functionalities of the software platform most called by users.

9. A system comprising:
one or more computers and one or more storage devices storing instructions that are operable, when executed by the one or more computers, to cause the one or more computers to perform operations comprising:
analyzing, by a self-qualified process (SQP) as part of a software as a service architecture and distinct from a cloud based software platform, a set of risks for the cloud based software platform, wherein the SQP is configured to qualify a plurality of unique software platforms that are required to be qualified, wherein each risk comprises a set of features that are being evaluated according to a risk definition, and wherein the set of features correspond to specific functionalities associated with the software platform that need to be qualified, and wherein qualification defines an assurance that a subject system is achieving expected acceptance criteria defined by particular quality attributes and parameters;
performing, by the SQP and on the software platform, one or more tests related to one or more risks of the set of risks, wherein the one or more tests for each risk are configured to cover the risk of the set of risks by a specified percentage, and wherein each test comprises a parameterized test definition, wherein each test is associated with a given risk and covers a particular percentage of the risk, and wherein each test is also associated with a given feature of the software platform and covers a particular percentage of the functionality of the given feature, such that a traceability matrix is determined having the dimensions of: risk definition, risk score, set of tests covering each risk, and set of features that are affected by each risk; and
generating an overall measure of a qualification state for the software platform, wherein each test output is associated with an acceptance test for the test that represents a corresponding measure of the qualification for a corresponding feature of the software platform, wherein the measure of the qualification state is based on an aggregated acceptance test output of the one or more tests, an aggregated risk calculated for the set of features, and a usage impact for the functionalities of the set of features, wherein the usage impact is calculated for each functionality based on user actions rates and system actions rates during execution of the corresponding feature, wherein the measure of the qualification is used to determine self-qualification of the software platform.

10. The system of claim 9, wherein the measure of the qualification state is an indication that the structures associated with the software platform under analysis satisfy particular criteria.

11. The system of claim 9, wherein analyzing the set of risks comprises evaluating software of the software platform for potential malfunctions of particular features, wherein each risk has a set of features and a score, and wherein each risk includes a numerical priority value assigned by one or more users of the software platform.

12. The system of claim 9, wherein each test has a test impact that is a function that depends on a number identifying multiple risks covered by the test and a number of features covered by the test, wherein minimizing the test impact values thereby minimizes the risk scores for the set of risks defined for the software platform.

13. The system of claim 9, wherein each test checks specific functionalities of the software platform and comprises a script or piece of source code isolated from the software platform that allows the SQP to verify a feature of the software platform based on particular conditions and test results.

14. The system of claim 9, wherein results of each test performed by the SQP are accumulated to generate an overall output for a current iteration, wherein the overall output is used to generate the measure of the qualification state for the software platform, the system further configured to perform operations comprising:
generating recommended tests based on the results of the current iteration; and
performing at least one additional iteration comprising execution of one or more of the recommended tests.

15. The system of claim 9, wherein the operations further comprise generating a recommendation of one or more tests that cover the set of risks based on ratings representing grades assigned by users to previously executed tests that have been successfully executed.

16. The system of claim 9, wherein the operations further comprise:
receiving feedback collected from users of the software platform;
applying machine learning to the feedback to assess a real utilization of the software platform; and
generating one or more recommendations based on the machine learning output, wherein the recommendation identify paths of functionalities of the software platform most called by users.

17. One or more non-transitory computer storage media encoded with computer program instructions that when executed by one or more computers cause the one or more computers to perform operations comprising:
analyzing, by a self-qualified process (SQP) as part of a software as a service architecture and distinct from a cloud based software platform, a set of risks for the cloud based software platform, wherein the SQP is configured to qualify a plurality of unique software platforms that are required to be qualified, wherein each risk comprises a set of features that are being evaluated according to a risk definition, and wherein the set of features correspond to specific functionalities associated with the software platform that need to be qualified, and wherein qualification defines an assurance that a subject system is achieving expected acceptance criteria defined by particular quality attributes and parameters;

performing, by the SQP and on the software platform, one or more tests related to one or more risks of the set of risks, wherein the one or more tests for each risk are configured to cover the risk of the set of risks by a specified percentage, and wherein each test comprises a parameterized test definition, wherein each test is associated with a given risk and covers a particular percentage of the risk, and wherein each test is also associated with a given feature of the software platform and covers a particular percentage of the functionality of the given feature, such that a traceability matrix is determined having the dimensions of: risk definition, risk score, set of tests covering each risk, and set of features that are affected by each risk; and generating an overall measure of a qualification state for the software platform, wherein each test output is associated with an acceptance test for the test that represents a corresponding measure of the qualification for a corresponding feature of the software platform, wherein the measure of the qualification state is based on an aggregated acceptance test output of the one or more tests, an aggregated risk calculated for the set of features, and a usage impact for the functionalities of the set of features, wherein the usage impact is calculated for each functionality based on user actions rates and system actions rates during execution of the corresponding feature, wherein the measure of the qualification is used to determine self-qualification of the software platform.

18. The computer storage media of claim 17, wherein the measure of the qualification state is an indication that the structures associated with the software platform under analysis satisfy particular criteria.

19. The computer storage media of claim 17, wherein analyzing the set of risks comprises evaluating software of the software platform for potential malfunctions of particular features, wherein each risk has a set of features and a score, and wherein each risk includes a numerical priority value assigned by one or more users of the software platform.

20. The computer storage media of claim 17, wherein each test has a test impact that is a function that depends on a number identifying multiple risks covered by the test and a number of features covered by the test, wherein minimizing the test impact values thereby minimizes the risk scores for the set of risks defined for the software platform.

* * * * *